May 19, 1964

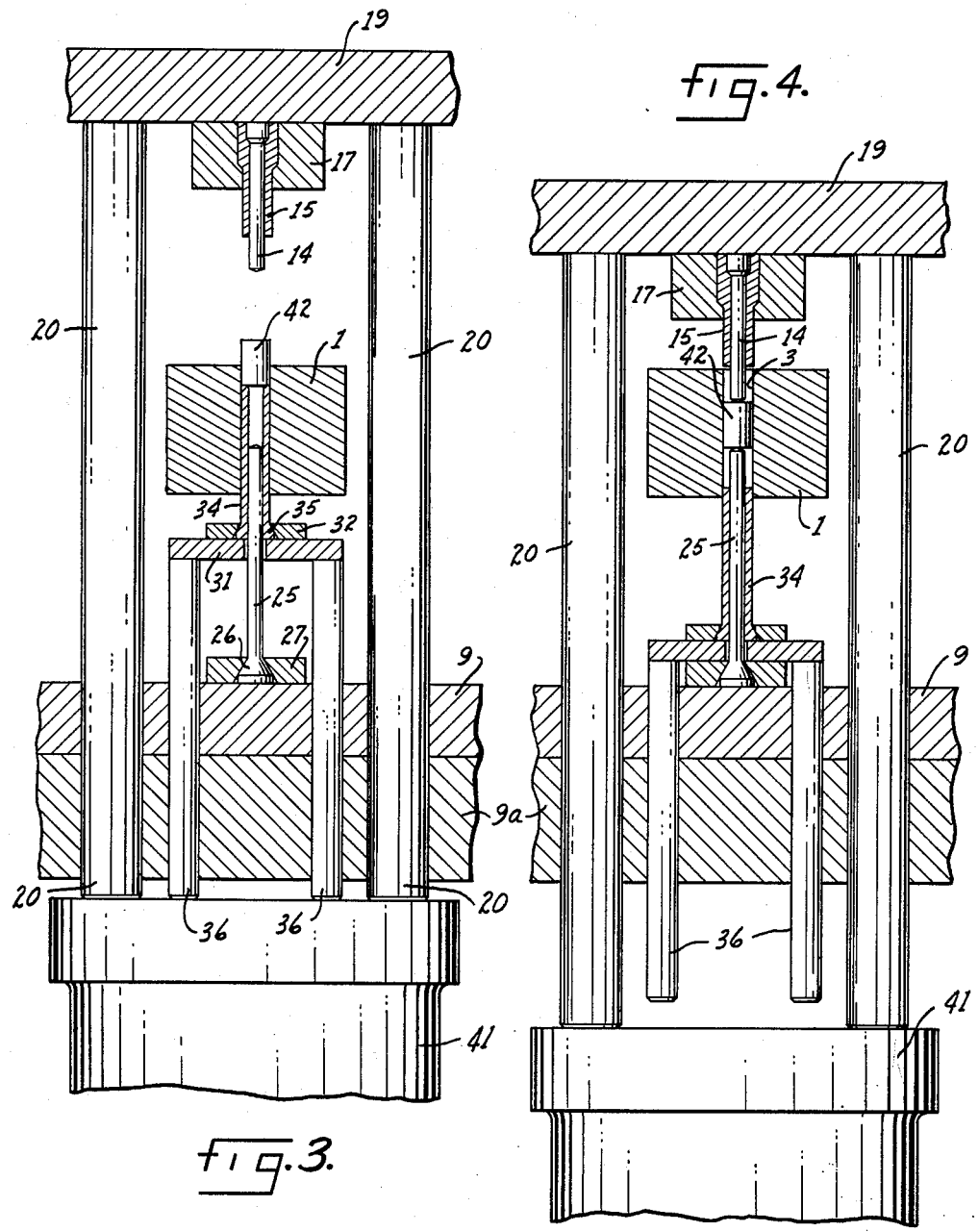

G. M. WALLER 3,133,458

EXTRUDING APPARATUS

Filed July 31, 1962

7 Sheets-Sheet 4

INVENTOR.
Gustav M. Waller,
BY Parker & Carter
Attorneys.

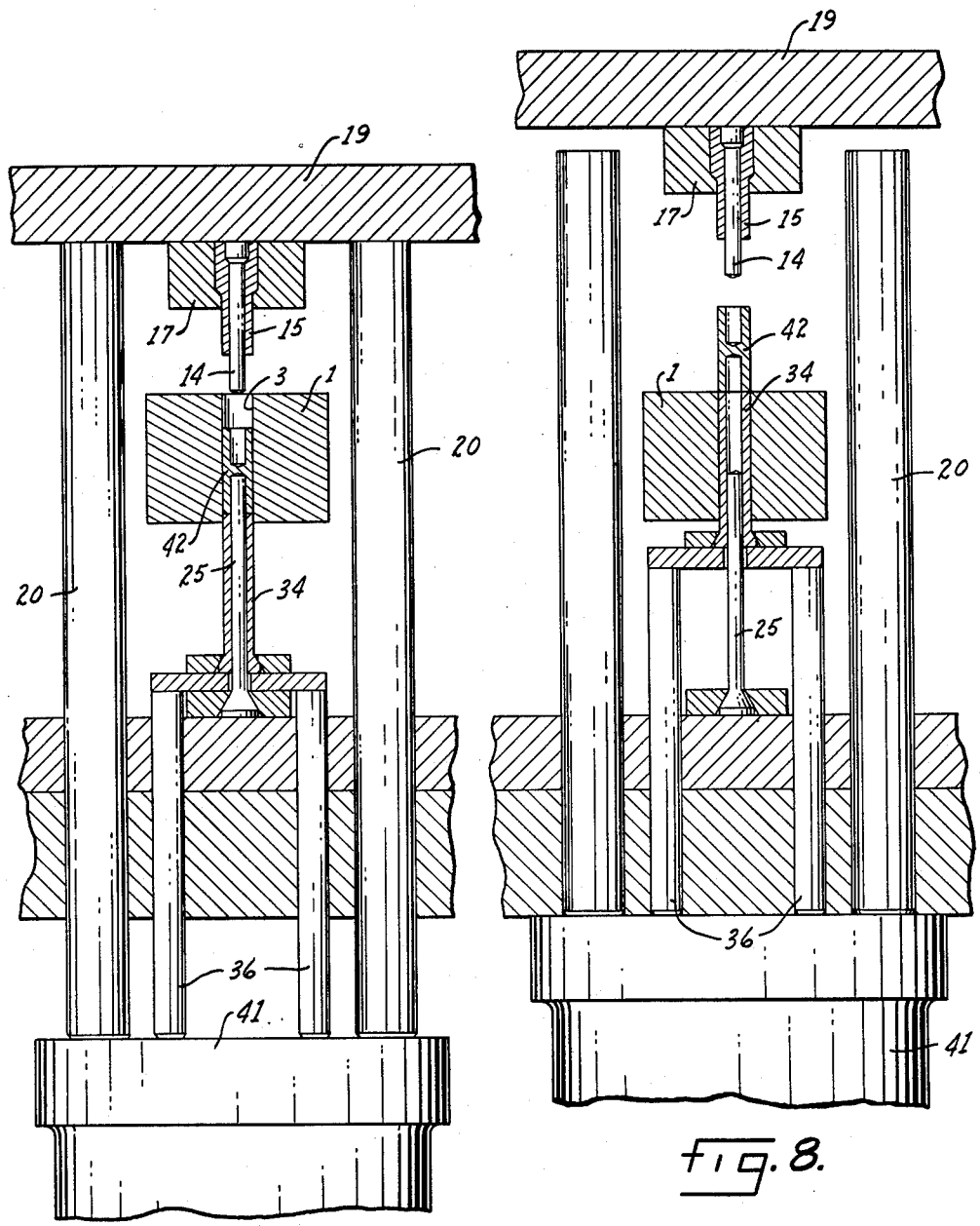

May 19, 1964 G. M. WALLER 3,133,458
EXTRUDING APPARATUS
Filed July 31, 1962 7 Sheets-Sheet 7

INVENTOR.
Gustav M. Waller,
BY Parker & Carter
Attorneys.

United States Patent Office 3,133,458
Patented May 19, 1964

3,133,458
EXTRUDING APPARATUS
Gustav M. Waller, Geneva, Ill., assignor to Burgess-Norton Mfg. Co., Geneva, Ill., a corporation of Illinois
Filed July 31, 1962, Ser. No. 213,738
7 Claims. (Cl. 78—9)

This invention relates to a machine for extruding metal parts and is a continuation in part of my co-pending application Serial No. 806,534, filed April 15, 1959, now abandoned.

A primary purpose of the invention is an extrusion machine having improved means for ejecting the finished parts.

Another purpose is an extrusion machine having means for delaying the movement of an ejector sleeve a sufficient period of time to complete the removal of the finished part and insertion of a new part to be extruded.

Other purposes will appear in the ensuing specification, drawings and claims.

Figure 1:
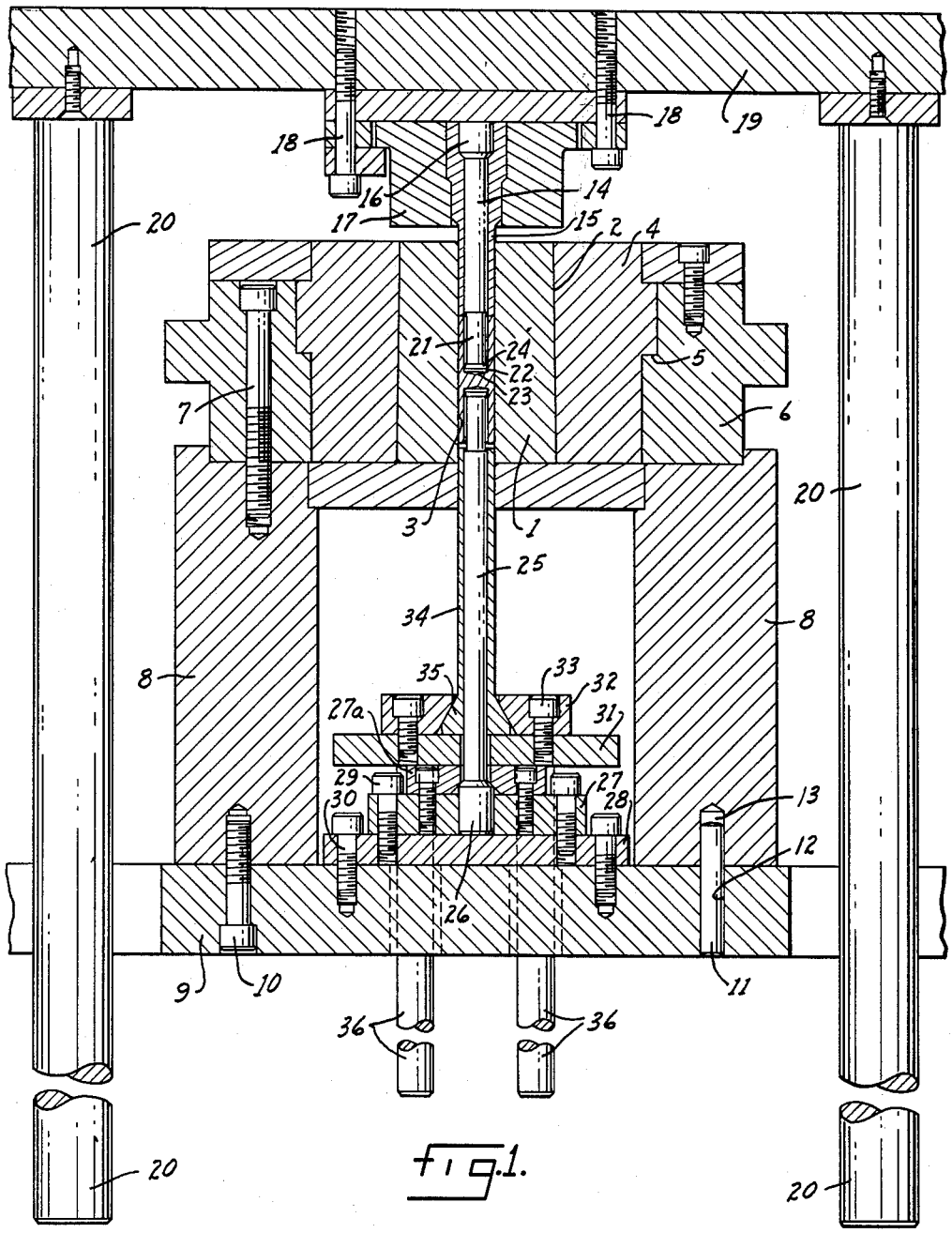
Figure 2:
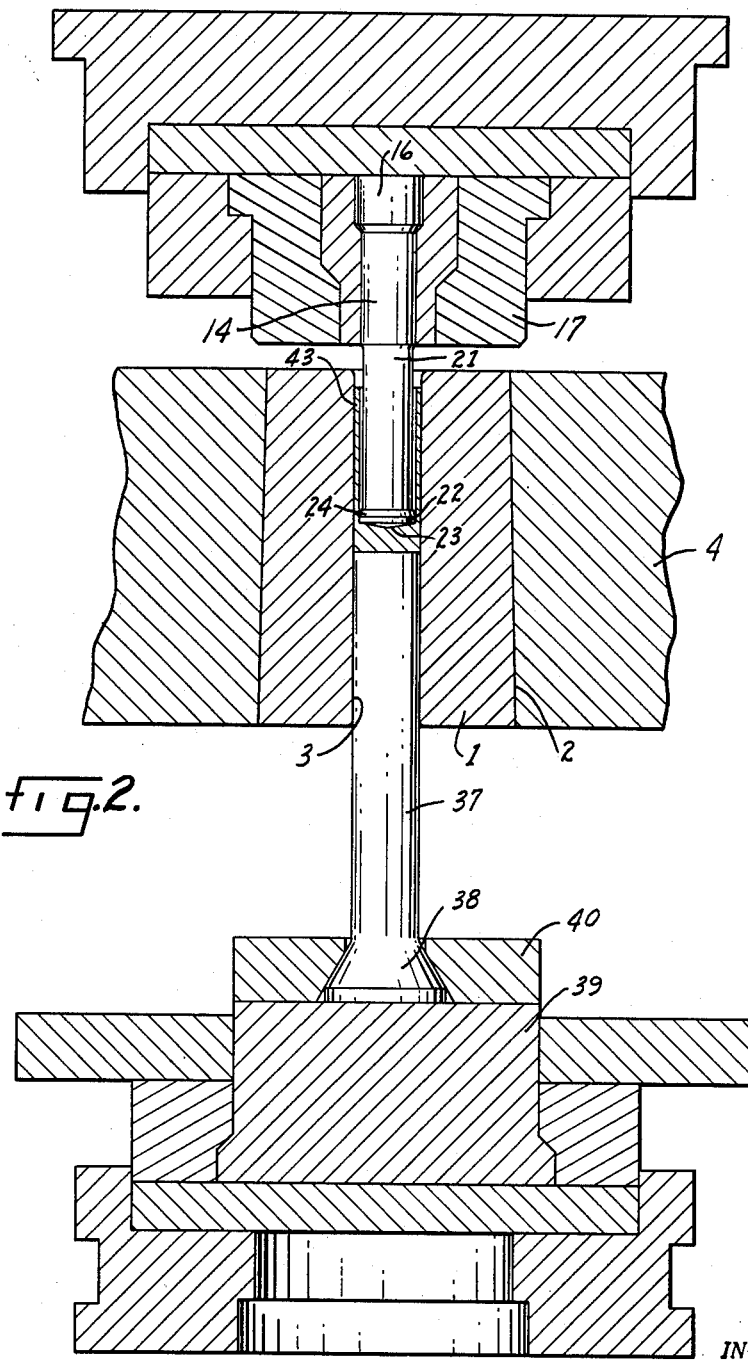
Figure 5:
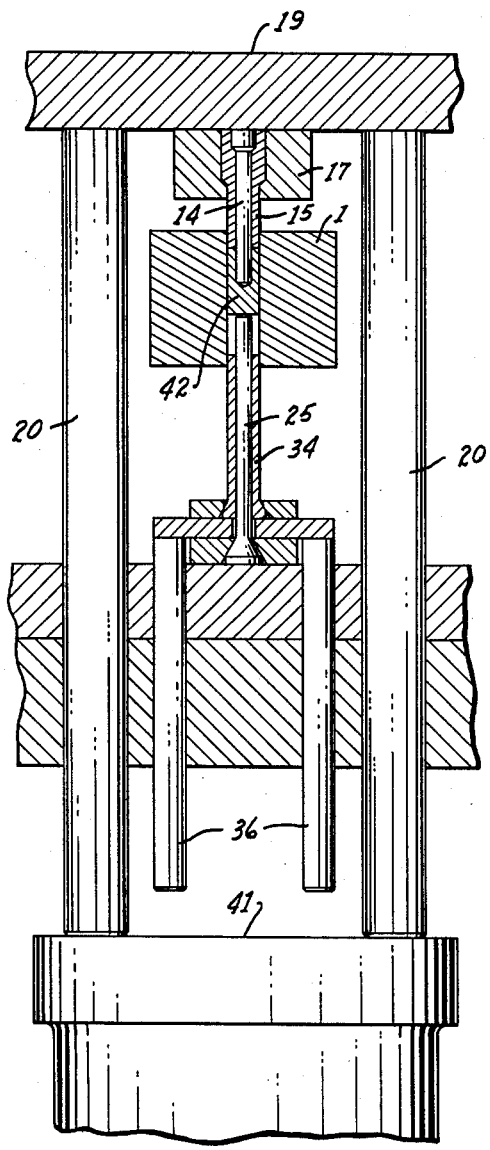
Figure 6:
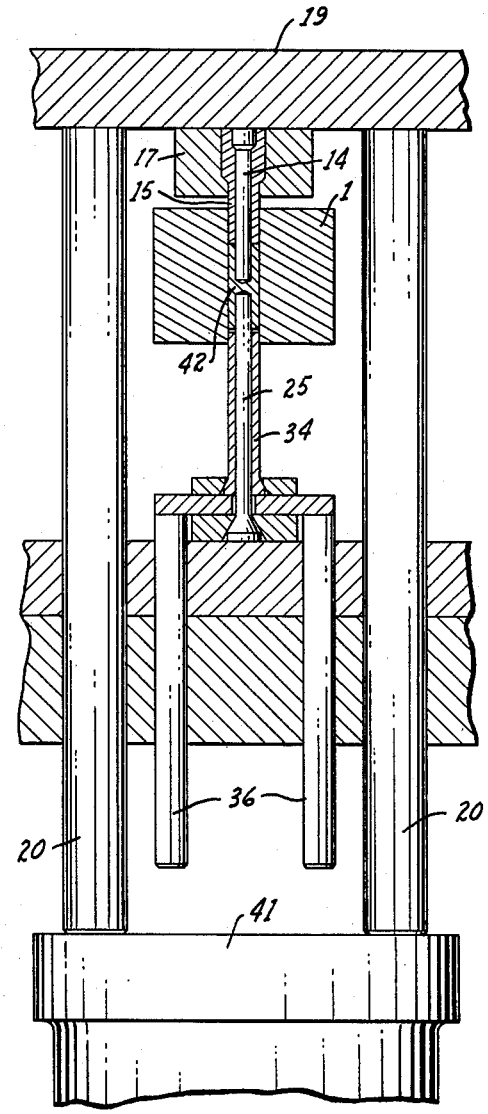
Figure 9:
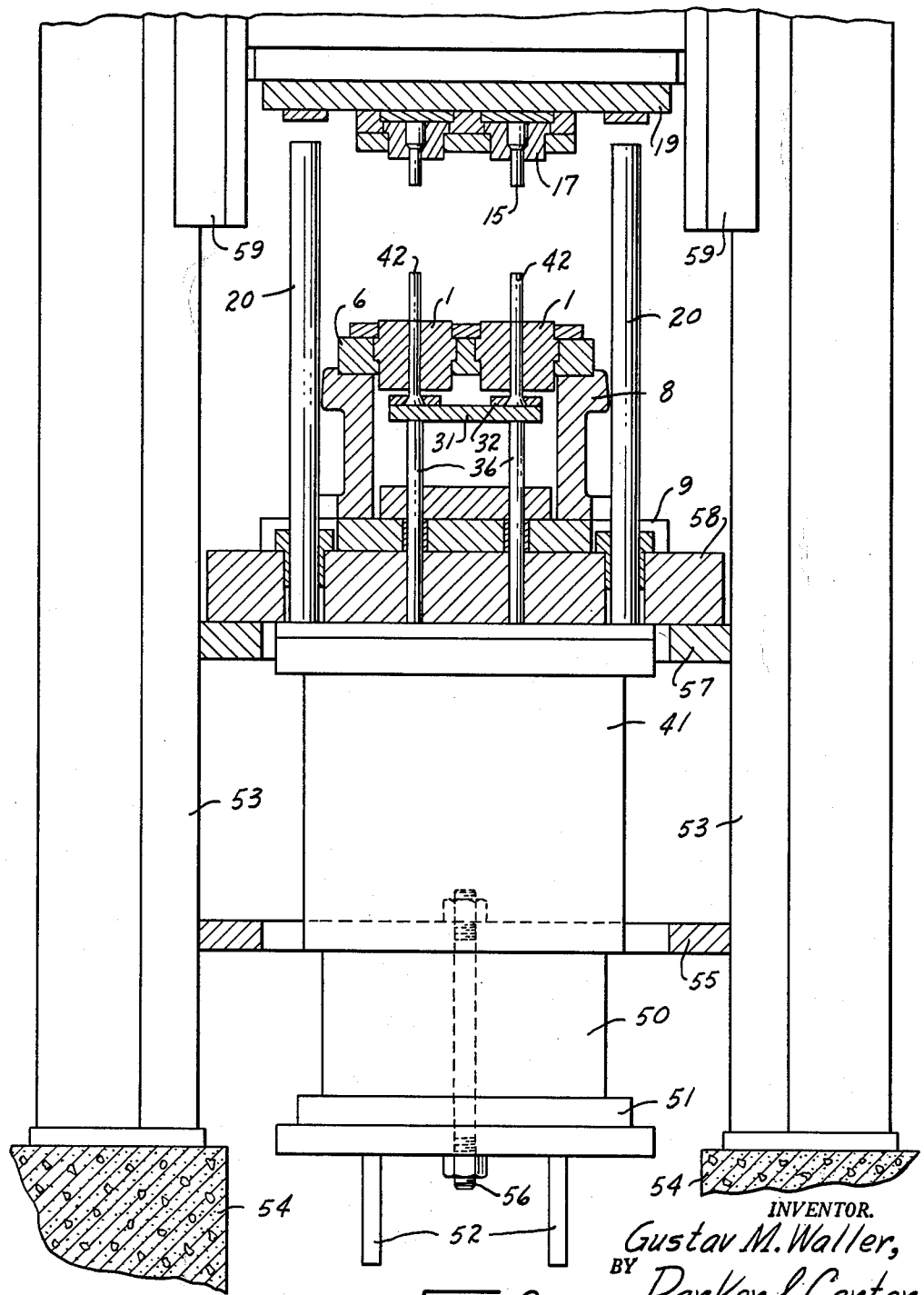
Figure 10:
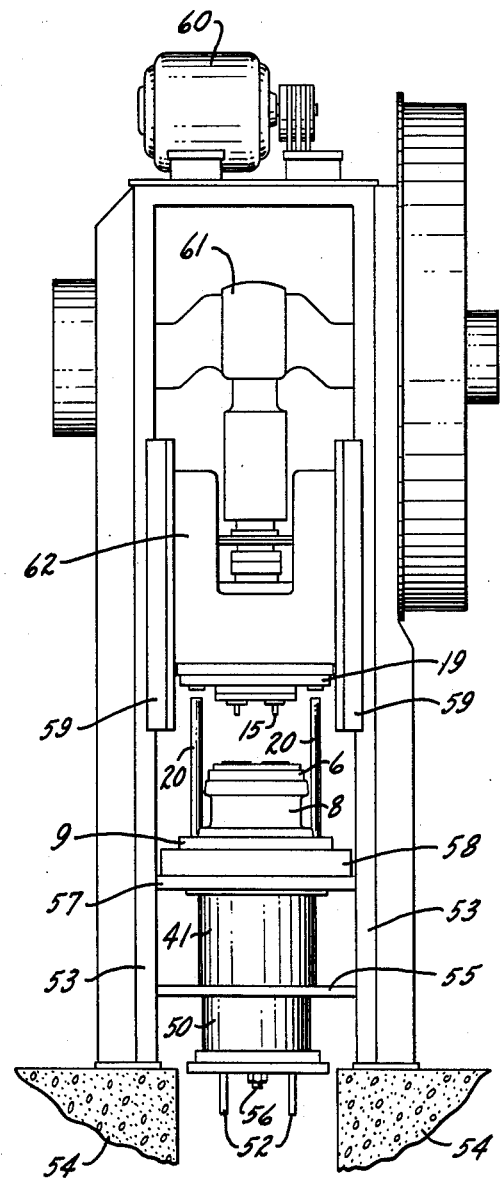

The invention is illustrated diagrammatically in the following drawings wherein:

FIGURE 1 is a generally vertical section with some parts in elevation illustrating one form of the device for carrying out the extrusion, the parts being in substantially the position which they occupy at the end of the extrusion process, FIGURE 2 is a vertical section with parts in elevation illustrating the parts at substantially the end of an extrusion operation in which only a single die is used, FIGURE 3 is a diagrammatic showing of the structure of FIGURE 1 with the parts in the position which they occupy at the beginning of an extrusion operation, FIGURE 4 is a view similar to FIGURE 3 showing the parts when the punches are in contact with the metal which is to be extruded, FIGURE 5 illustrates the structure of FIGURE 4 with the parts in the position which they occupy at an intermediate position, FIGURE 6 illustrates the structure of FIGURE 5 with the parts in the position which they occupy at the completion of the extrusion operation, FIGURE 7 is a view similar to FIGURES 3–6, illustrating the position of the parts when the upper punch has been withdrawn, FIGURE 8 illustrates the parts in the position they occupy after ejection has been substantially completed, FIGURE 9 shows a press frame with a modified form of extrusion device having provisions for two simultaneous extrusion operations, and FIGURE 10 illustrates the combination of a punch press and the extrusion apparatus shown in detail in FIGURE 1.

The structure as illustrated in FIGURES 1 and 3–8 comprises a single mechanism for carrying out a double backward extrusion. As shown in FIGURES 9 and 10 each press may mount a number of extrusion mechanisms for simultaneous operation. For purposes of simplicity, only one mechanism will be described in detail.

The article to be formed may be hollow and normally will be shaped to provide some enclosed space within itself. It may be shaped into any one of a variety of shapes. As shown in FIGURE 1, the article which is being formed may be considered a bearing pin or wrist pin. Two punches cooperate and produce a generally hollow tubular member by double backward extrusion.

In the structure shown in FIGURE 2 a single punch enters the metal and forms, by a single backward extrusion, a shell which has a solid or closed end and is generally tubular throughout the rest of its length.

The punch members as shown in the diagrammatic sequence embodied in FIGURES 3–8 inclusive, are simplified. The punch members will be substantially shown in detail in FIGURES 1 and 2. Preferably the punches are substantially identical when two punches are used.

The mechanism as shown includes a die part provided with a cavity. The metal is extruded within this cavity, and the punch members, whether one or more than one are present, act upon the metal within the cavity in the die. The die is preferably tapered exteriorly so that it can be removably positioned within the carrying parts of the press in which the operation takes place. It may, however, also be straight walled.

The punch members are removable, and thus the mechanism may be altered by the substitution of different dies or punches in order to form articles of different shapes.

In the particular form of mechanism shown, 1 is a die shaped with an exteriorly tapered surface 2 and provided with an interior bore 3. The die is held in a block 4 shaped, as at 5, to engage a carrying member 6. This carrying member is fastened by screws 7 or otherwise to support 8, which is fastened to a fixed die shoe 9 by screws 10 or otherwise. Positioning pins 11 may be used and, when used, enter perforations 12 and 13 formed respectively in the die shoe 9 and one or another of the supports 8.

To form the device shown in FIGURES 1 and 3–8, inclusive, two punches are used. There is an upper punch 14 positioned with a punch sleeve 15. The punch 14 is provided with an enlarged upper end or head 16 which fits within a correspondingly enlarged cavity in the sleeve 15.

The invention is not limited to any precise method of holding the upper punch in place. As shown, a punch block 17 engages the sleeve 15 and is held by screws 18, or otherwise, to the punch holder 19. The punch holder 19 abuts the timing rods 20 which extend through suitable openings in the die shoe 9.

The upper punch 14 is preferably reduced, as at 21, and is provided with an enlarged head 22 which has a rounded or conical outer end face 23. The enlargement 22 is preferably connected to the reduced portion 21 by means of an inclined area or portion 24. As mentioned above, the shape of the end of the punches as shown in FIGURES 3–8 inclusive, has been simplified and the parts shown as though of constant diameter. They are, in fact, normally of the shape shown in FIGURES 1 and 2.

As shown in FIGURE 1, in which two punches are used, there is a fixed lower punch 25 which is provided with an enlarged lower end 26 received in a locator or support 27. The locator is mounuted upon a plate 28 and is secured to it by screw 29 or otherwise. Positioned above the locator 27 is a holding member 27a. Positioned above holding member 27a is an ejection sleeve holding plate 31 which carries ring 32 secured to it by screws 33, or otherwise.

An ejection sleeve 34 is positioned outside of the lower punch 25 and is mounted for movement with relation to it. The sleeve 34 is enlarged as at 35, and is held in the ring 32 and bears at its lower end upon the plate 31.

The plate 31 has secured to it ejection rods 36 which may be moved to raise the plate 31, and thus to raise the ejection sleeve 34. By this means the ejection sleeve may have longitudinal movement in relation to the fixed lower punch 25.

In the form shown in FIGURE 2, only a single upper punch is used. This is substantially the same as the upper punch shown in FIGURE 1 and the means of supporting it and moving it are the same as those shown in FIGURE 1, and need not be redescribed.

In place of the lower punch and ejection sleeve of FIGURE 1, the form of the device in FIGURE 2 includes only an ejection punch 37. This punch fits closely within the bore 3 of the die 1 and is given reciprocation in it when required for ejection or for other reasons. The punch 37 is enlarged, as at 38, and rests upon a block 39 being held by a ring-like member 40. The precise details of supporting the ejection punch 37 are not shown as they form no essential part of the invention. It is sufficient to state that the punch is supported in the mechanism shown in FIGURE 2, and the parts similar to the ejection rods of FIGURE 1 are provided to raise the member 37 when required to eject the formed piece from the die.

FIGURES 9 and 10 show a multiple set of punches in a suitable press framework. Frame members 53 may rest on a concrete foundation or floor 54 and have upper slide members 59 secured thereto. A suitable drive motor 60 mounted on top of the press may rotate a crank 61 through a suitable drive arrangement. The crank 61 is effective to reciprocate the press ram 62 on which is mounted punch holder 19. In this form of the invention, there are two extrusion devices and therefore there are two punch sleeves 15. The details of the punch sleeves and the punch are not shown in this figure as it is to be understood that they would be the same as described before.

The die shoe 9 upon which support 8 is seated is positioned and supported by bolster plate 58. The bolster plate in turn is placed and supported on the bed 57 of the press. The support 8 positions a carrying member 6 which contains two dies 1. Each of these dies is similar to that described before and provides means by which slugs 42 may be suitably extruded.

Positioned beneath the bed 57 is a die cushion 41. The die cushion may be forced upward by means of air pressure in the die cushion air cylinder 50. The bottom 51 of the die cushion air cylinder is suitably secured by bolts 56 or the like to a bottom bed plate 55 which is secured to the press frame 53.

In operation, the press ram will drive punch holder 19 downward. When the punch holder contacts the timing rods 20, movement of the punch holder is transferred to the die cushion and it is forced downward bringing the ejection sleeve down with it. After the extrusion operation is complete, the press ram and punch holder start up. The die cushion, actuated by air cylinder 50, follows the punch holder up, in a manner controlled by the timing rods 20. The length of the timing rods is important and will vary in accordance with the size of the extruded part as pointed out hereinafter.

Prior to placing the slug in the die, the slug should be coated with a suitable lubricant. The particular lubricant used will depend to a large extent on the metal being extruded. For example, in the case of sintered metal, a colloidal graphite is included in the lubricant, whereas in the case of steel, a zinc stearate or molybdenum disulphite can be used. The lubricant must be able to withstand the high pressures that occur in cold extruding such as shown herein and for that reason zinc stearate is preferred.

A sequence of operations from the start to finish is shown in FIGURES 3–8 inclusive. These are diagrammatic showings and parts have been omitted for simplicity.

In the starting position of FIGURE 3 the parts described above are in the positions shown and the ejection sleeve 34 has been lowered by downward movement of the die cushion 41 through timing rods 20 so that the upper end of the sleeve 34 is a suitable distance below the top of die 1. A metal slug 42 has been inserted in die 1 cavity in place for forming.

The second step in the forming operation is shown in FIGURE 4. The die cushion 41 has been lowered by punch holder 19 and the timing rods 20 and moved out of contact with the ejection rods 36. Lowering of the die cushion has lowered the parts which carry the ejection sleeve 34 and it has been withdrawn to its lowermost position. This uncovers the upper end of lower punch 25 and the metal slug 42, which originally rested upon the upper end of the ejection sleeve, has been lowered until it rests upon the upper end of the lower punch. At the same time the upper punch 14 has entered the bore 3 of the die 1 and has been brought into contact with the upper surface of the metal slug 42.

As shown in FIGURE 5, the upper punch has been carried farther down into the bore of the die 1 and has been forced into the metal slug 42, causing upward flow of the metal so that its upper end has been made hollow or cup-shaped. No penetration of the metal by the lower punch 25 has yet taken place as all of the extrusion has been in an upward direction. Sleeve 15 limits the extrusion in an upward direction.

As shown in FIGURE 6, the upper punch 14 has been carried downward beyond the position which it occupied in FIGURE 5, and with it has come the sleeve 15 which is fixed thereto. The further downward movement of the punch 14 and the sleeve 15 toward the lower punch 25 has caused downward flow of the metal of the slug 42. As shown in FIGURE 6, the metal has been forced or flowed downwardly about the lower punch 25. The completion of its downward movement will cause the metal of the slug 42 to move in the direction of the upper end of the ejection sleeve 34. When this takes place the article is completed and at the final position of the extrusion operation the metal of the article 42 will normally be in contact with the lower end of the upper punch sleeve 15 and the upper end of the ejection sleeve 34. At the same time, the upper punch 14 will have approached its closed position with respect to the lower punch 25.

The forming operation has been completed when the parts are in the position of FIGURE 6 and ejection is about to commence. As the punch holder 19 and hence punch 14 move up, the die cushion will begin its upward movement. As shown in FIGURE 7, punch 14 has been removed from the die and the die cushion has contacted ejection rods 36.

As shown in FIGURE 8, the die cushion 41 has moved still farther upwardly. The die cushion has pushed the ejector sleeve 34 up so that the finished part is ejected. The upper punch 14 and the punch holder 19 have reached the top of their upward travel and are ready to begin downward movement for the next cycle of operation. Of importance is the fact that at this position the timing rods are not in contact with the punch holder. The timing rods are shorter than the distance between the punch holder and die cushion when both are in the up position. In this way there will be a predetermined amount of delay before the die cushion and hence the ejector sleeve starts downward. This delay is necessary to remove the finished part and put in a new workpiece. This delay is variable and will depend upon the height of the extruded part. The higher the part, the more delay that is necessary. This delay on the length of the timing rods is important to complete ejection and insertion of the new workpiece.

The operation of forming a member such as that shown in FIGURE 2 is substantially the same as that above described, except that after the forming operation has been completed, as shown in FIGURE 2, the upper punch is withdrawn and the member 37 is forced upwardly to eject the finished piece 43. The ejection member 37 will be carried upwardly high enough through the bore 3 of the die 1 to eject the finished piece 43.

As shown herein, variable length timing rods are used to control the delay time. Other means may also be satisfactory.

Whereas the preferred form of the invention has been shown and described herein, it should be realized that there are many modifications, substitutions and alterations thereto, within the scope of the following claims.

I claim:

1. In combination with a punch press, a die cushion, a die and means for supporting it in said punch press, a punch holder mounted in said press and means for reciprocating it toward and away from said die and die cushion, a punch secured to said punch holder and positioned to move in and out of said die, a sleeve positioned about said punch and fixed in relation thereto, a second punch positioned on the opposite side of the die and axially aligned therewith, an ejector sleeve positioned about said second punch and supported for relative axial movement with respect thereto, ejector pins in contact with the support for said ejector sleeve and positioned to contact said die cushion, said ejector pins raising and lowering said ejector sleeve in accordance with movement of said die cushion, and vertical timing pins in contact with said die cushion and supported in said punch press for vertical reciprocation, said timing pins being positioned for contact by the punch holder to transmit its movement to said die cushion, said timing pins being shorter than the distance betwen said die cushion and said punch holder when each is at the upper limit of its movement whereby there is a predetermined delay between downward movement of the punch holder and downward movement of the ejector sleeve.

2. The structure of claim 1 further characterized in that the length of said timing pins varies in accordance with the size of the part being extruded.

3. The structure of claim 2 further characterized in that said second punch is fixed, with said ejector sleeve moving thereon.

4. The structure of claim 1 further characterized in that said punches are generally the same in size and shape.

5. The structure of claim 1 further characterized by a support fixedly mounting said second punch, said ejector pins and timing pins extending through said support.

6. In combination with a punch press, a die cushion, a die and means for supporting it in said punch press, a punch holder mounted in said press and means for reciprocating it toward and away from said die and die cushion, means for moving the die cushion in accordance with movement of said punch holder, a punch secured to said punch holder and positioned on the opposite side of the die and axially aligned therewith, an ejector sleeve positioned about said second punch and supported for relative axial movement with respect thereto, means for moving said ejector sleeve in accordance with movement of the die cushion, and means for delaying the downward movement of the die cushon and the ejector sleeve for a predetermined amount after initial downward movement of the punch holder.

7. In combination with a punch press, a die cushion, a die and means for supporting it in said punch press, a punch holder mounted in said press and means for reciprocating it toward and away from said die and die cushion, means for moving the die cushion in accordance with movement of said punch holder, a punch secured to said punch holder and positioned to move in and out of said die, means for ejecting a finished part out of said die, means for moving said ejecting means in accordance with movement of the die cushion, and means for delaying the downward movement of the die cushion and the ejector means for a predetermined amount after initial downward movement of the punch holder.

References Cited in the file of this patent

UNITED STATES PATENTS

| | | |
|---|---|---|
| 336,604 | Tweddell | Feb. 23, 1886 |
| 1,415,459 | Limont | May 9, 1922 |
| 2,371,304 | Lorant | Mar. 13, 1945 |
| 2,417,569 | Rice | Mar. 18, 1947 |
| 3,064,347 | Hilton | Nov. 20, 1962 |

FOREIGN PATENTS

| | | |
|---|---|---|
| 484,853 | Stabeg | May 11, 1938 |